(12) United States Patent
Naumov et al.

(10) Patent No.: US 11,468,313 B1
(45) Date of Patent: Oct. 11, 2022

(54) SYSTEMS AND METHODS FOR QUANTIZING NEURAL NETWORKS VIA PERIODIC REGULARIZATION FUNCTIONS

(71) Applicant: Meta Platforms, Inc., Menlo Park, CA (US)

(72) Inventors: Maxim Naumov, Redwood City, CA (US); Abdulkadir Utku Diril, Menlo Park, CA (US); Jong Soo Park, Menlo Park, CA (US); Benjamin Ray, Menlo Park, CA (US); Jedrzej Jablonski, Seattle, WA (US); Andrew John Tulloch, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1157 days.

(21) Appl. No.: 16/006,095

(22) Filed: Jun. 12, 2018

(51) Int. Cl.
  *G06N 3/08* (2006.01)
  *G06N 10/00* (2022.01)
  *G06N 5/00* (2006.01)
  *G06N 3/06* (2006.01)
  *G06N 3/04* (2006.01)

(52) U.S. Cl.
  CPC ............. *G06N 3/08* (2013.01); *G06N 3/0472* (2013.01); *G06N 3/061* (2013.01); *G06N 3/082* (2013.01); *G06N 5/00* (2013.01); *G06N 5/003* (2013.01); *G06N 10/00* (2019.01)

(58) Field of Classification Search
  CPC ........ G06N 3/08; G06N 10/00; G06N 3/0472; G06N 3/061; G06N 3/082; G06N 5/00; G06N 5/003
  See application file for complete search history.

(56) References Cited

PUBLICATIONS

Song et al., "A Quantization-aware Regularized Learning Method in Multilevel Memristor-based Neuromorphic Computing System", Aug. 18, 2017, 2017 IEEE 6th Non-Volatile Memory Systems and Applications Symposium (NVMSA), pp. 1-6. (Year: 2017).*
ZongBen et al., "L1/2 regularization", Jun. 2010, Science China, Information Sciences, vol. 53 No. 6:, pp. 1159-1169. (Year: 2010).*

(Continued)

*Primary Examiner* — Brent Johnston Hoover
(74) *Attorney, Agent, or Firm* — FisherBroyles, LLP

(57) ABSTRACT

The disclosed computer-implemented method may include (1) identifying an artificial neural network comprising a set of nodes interconnected via a set of connections, and (2) training the artificial neural network by, for each connection in the set of connections, determining a quantized weight value associated with the connection. Determining the quantized weight value associated with the connection may include (1) associating a loss function with the connection, the loss function including a periodic regularization function that describes a relationship between an input value and a weight value of the connection, (2) determining a minimum of the associated loss function with respect to the weight value in accordance with the periodic regularization function, and (3) generating the quantized weight value associated with the connection based on the determined minimum of the loss function. Various other methods, systems, and computer-readable media are also disclosed.

20 Claims, 10 Drawing Sheets

(56) References Cited

PUBLICATIONS

Hung et al., "Bridge deep learning to the physical world: An efficient method to quantize network", Oct. 16, 2015, 2015 IEEE Workshop on Signal Processing Systems (SiPS), pp. 1-6. (Year: 2015).*

Benoit Jacob, Skirmantas Kligys, Bo Chen, Menglong Zhu and Matthew Tang, Andrew Howard, Hartwig Adam, and Dmitry Kalenichenko. Quantization and training of neural networks for efficient integer-arithmetic-only inference, http://arxiv.org/abs/1712.05877v1 (Dec. 15, 2017).

He Wen, Shuchang Zhou, Zhe Liang, Yuxiang Zhang, Dieqiao Feng, Xinyu Zhou, and Cong Yao. Training bit fully convolutional network for fast semantic segmentation. http://arxiv.org/abs/1612.00212v1 (Dec. 1, 2016).

Itay Hubara, Matthieu Courbariaux, Daniel Soudry, Ran El-Yaniv, and Yoshua Bengio. Quantized neural networks: Training neural networks with low precision weights and activations. http://arxiv.org/abs/1609.07061v1 (Sep. 22, 2016).

Lorenzo Rosasco and Ernesto De Vito and Andrea Caponnetto and Michele Piana and Alessandro Verri. Are Loss Functions All the Same? http://web.mit.edu/lrosasco/www/publications/loss.pdf (Sep. 30, 2003).

Szymon Migacz. 8-bit Inference with TensorRT. GPU Technology Conference 2017. http://on-demand.gputechconf.com/gtc/2017/presentation/s7310-8-bit-inference-with-tensorrt.pdf (May 8, 2017).

Yunchao Gong, Liu Liu, Ming Yang, and Lubomir Bourdev. Compressing deep convolutional networks using vector quantization. http://arxiv.org/abs/1412.6115v1 (Dec. 18, 2014).

* cited by examiner

Listing 1000

1002  max_w = m.weight.abs().max()

1004  m.weight.data.mul_(frequency/max_w.data)

1006  m.weight.data.round_()

1008  m.weight.data.mul_(max_w.data/frequency)

SYSTEMS AND METHODS FOR QUANTIZING NEURAL NETWORKS VIA PERIODIC REGULARIZATION FUNCTIONS

BACKGROUND

Artificial intelligence (AI) can enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network, is inspired by the interconnections of neurons in a biological brain. Typically, artificial neural networks include multiple computational nodes arranged in interconnected layers, with each node modeling a neuron that may receive one or more inputs, process the inputs, and pass an output to the next layer, with the final layer producing a desired output. In some examples, each node may assign a weight to each of its inputs and then combine (e.g., sum) the weighted inputs to produce a result from that node. For example, if a task involves identifying a particular object in an image, filter weights may be trained to correspond to a probability that the input image includes the object.

Some operations of artificial neural networks may require a high amount of computing resources, which may limit computing hardware devices that may effectively utilize such artificial neural networks (e.g., to make inferences regarding data using a particular artificial neural network). In recent years, methods have been developed that may modify specific aspects of artificial neural networks such that the artificial neural networks may be utilized by computing hardware devices with fewer and/or more specific computing capabilities. For example, quantization processes may apply techniques to store numbers and/or perform calculations associated with an artificial neural network in more compact and/or more efficient formats (e.g., integers).

Unfortunately, conventional quantization methods may be overly complicated and/or may be difficult to implement. Therefore, these complicated quantization methods may increase the cost and or the difficulty of quantizing artificial neural networks. The instant disclosure, therefore, identifies and addresses a need for additional systems and methods for quantizing artificial neural networks.

SUMMARY

As will be described in greater detail below, the instant disclosure describes various systems and methods for quantizing neural networks via periodic regularization functions by including periodic regularization functions within loss functions that may be used to determine weight values for connections between nodes within artificial neural networks. Utilizing such periodic regularization functions to determine weight values associated with connections between nodes during training of an artificial neural network may cause resulting weight values to be closer to easily quantizable values, and may therefore allow for simpler and/or more accurate quantization of weight values within trained artificial neural networks.

In one example, a computer-implemented method for quantizing neural networks via periodic regularization functions may include identifying an artificial neural network that may include a set of nodes interconnected via a set of connections, and training the artificial neural network by, for each connection in the set of connections, determining a quantized weight value associated with the connection. In at least some embodiments, determining the quantized weight value associated with the connection may include associating a loss function with the connection. In some embodiments, the loss function may include a periodic regularization function that describes a relationship between an input value and a weight value of the connection. In at least some examples, determining the quantized weight value associated with the connection may further include (1) determining a minimum of the associated loss function with respect to the weight value in accordance with the periodic regularization function, and (2) generating the quantized weight value associated with the connection based on the determined minimum of the loss function.

In some examples, the periodic regularization function may include a trigonometric function. In at least one example, the trigonometric function may include at least one of (1) a sine function, or (2) a cosine function. In at least one example, the periodic regularization function may include a sawtooth function. In at least one example, the periodic regularization function may include a triangular function.

In at least one embodiment, the periodic regularization function may include an amplitude factor. In some embodiments, the periodic regularization function may include a scaling factor. In at least one embodiment, the scaling factor may scale the periodic regularization function such that a result of the periodic regularization function may be in an inclusive range from 0 to 1.

In at least one example, generating the quantized weight value associated with the connection based on the determined minimum of the loss function may include (1) selecting a subset of connections from the set of connections, the connection included in the selected subset of connections, (2) identifying a maximum absolute value of the determined minimums of the loss functions associated with the connections included in the subset of connections, and (3) scaling the minimum of the loss function based on the identified maximum absolute value and a frequency. In some examples, generating the quantized weight value associated with the connection based on the determined minimum of the loss function may further include (1) rounding the scaled minimum of the loss function to a nearest integer value, (2) re-scaling the rounded and scaled minimum of the loss function based on the maximum absolute value and the frequency, and (3) designating the re-scaled minimum of the loss function as the quantized weight value associated with the connection.

In some embodiments, the method may further include (1) receiving a number of bits for a representation of the quantized weight value, and (2) determining a frequency of the periodic regularization function based on the received number of bits. In some examples, the method may further include predicting an output value based on the input value via the trained artificial neural network.

In addition, a corresponding system for quantizing neural networks via periodic regularization functions may include several modules stored in memory, including (1) an identifying module that identifies an artificial neural network that may include a set of nodes interconnected via a set of connections, and (2) a training module that trains the artificial neural network by, for each connection in the set of connections, determining a quantized weight value associated with the connection. In some examples, the training module may determine the quantized weight value associated with the connection by associating a loss function with the connection. The loss function may include a periodic regularization function that describes a relationship between an input value and a weight value of the connection. The training module may further determine the quantized weight value associated with the connection by (1) determining a minimum of the associated loss function with respect to the weight value in accordance with the periodic regularization function, and (2) generating the quantized weight value associated with the connection based on the determined minimum of the loss function. The system may further include at least one physical processor that executes the identifying module and the training module.

In some examples, the periodic regularization function may include a trigonometric function. In at least one example, the trigonometric function may include at least one of (1) a sine function, or (2) a cosine function. In at least one example, the periodic regularization function may include at least one of a sawtooth function or a triangular function. In at least one example, the periodic regularization function may include a scaling factor.

In at least one example, the training module may generate the quantized weight value associated with the connection based on the determined minimum of the loss function by (1) selecting a subset of connections from the set of connections, the connection included in the selected subset of connections, (2) identifying a maximum absolute value of the determined minimums of the loss functions associated with the connections included in the subset of connections, and (3) scaling the minimum of the loss function based on the identified maximum absolute value and a frequency. In some examples, the training module may further generate the quantized weight value associated with the connection based on the determined minimum of the loss function by (1) rounding the scaled minimum of the loss function to a nearest integer value, (2) re-scaling the rounded and scaled minimum of the loss function based on the maximum absolute value and the frequency, and (3) designating the re-scaled minimum of the loss function as the quantized weight value associated with the connection.

In some embodiments, the training module may further (1) receive a number of bits for a representation of the quantized weight value, and (2) determine a frequency of the periodic regularization function based on the received number of bits.

In some examples, the system may further include a predicting module that predicts an output value based on the input value via the trained artificial neural network. In at least one example, the physical processor may further execute the predicting module.

In some examples, the above-described method may be encoded as computer-readable instructions on a computer-readable medium. For example, a computer-readable medium may include one or more computer-executable instructions that, when executed by at least one processor of a computing device, may cause the computing device to (1) identify an artificial neural network that may include a set of nodes interconnected via a set of connections, and (2) train the artificial neural network by, for each connection in the set of connections, determining a quantized weight value associated with the connection. In at least some embodiments, determining the quantized weight value associated with the connection may include associating a loss function with the connection. In some examples, the loss function may include a periodic regularization function that describes a relationship between an input value and a weight value of the connection. In some embodiments, determining the quantized weight value associated with the connection may further include (1) determining a minimum of the associated loss function with respect to the weight value in accordance with the periodic regularization function, and (2) generating the quantized weight value associated with the connection based on the determined minimum of the loss function.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
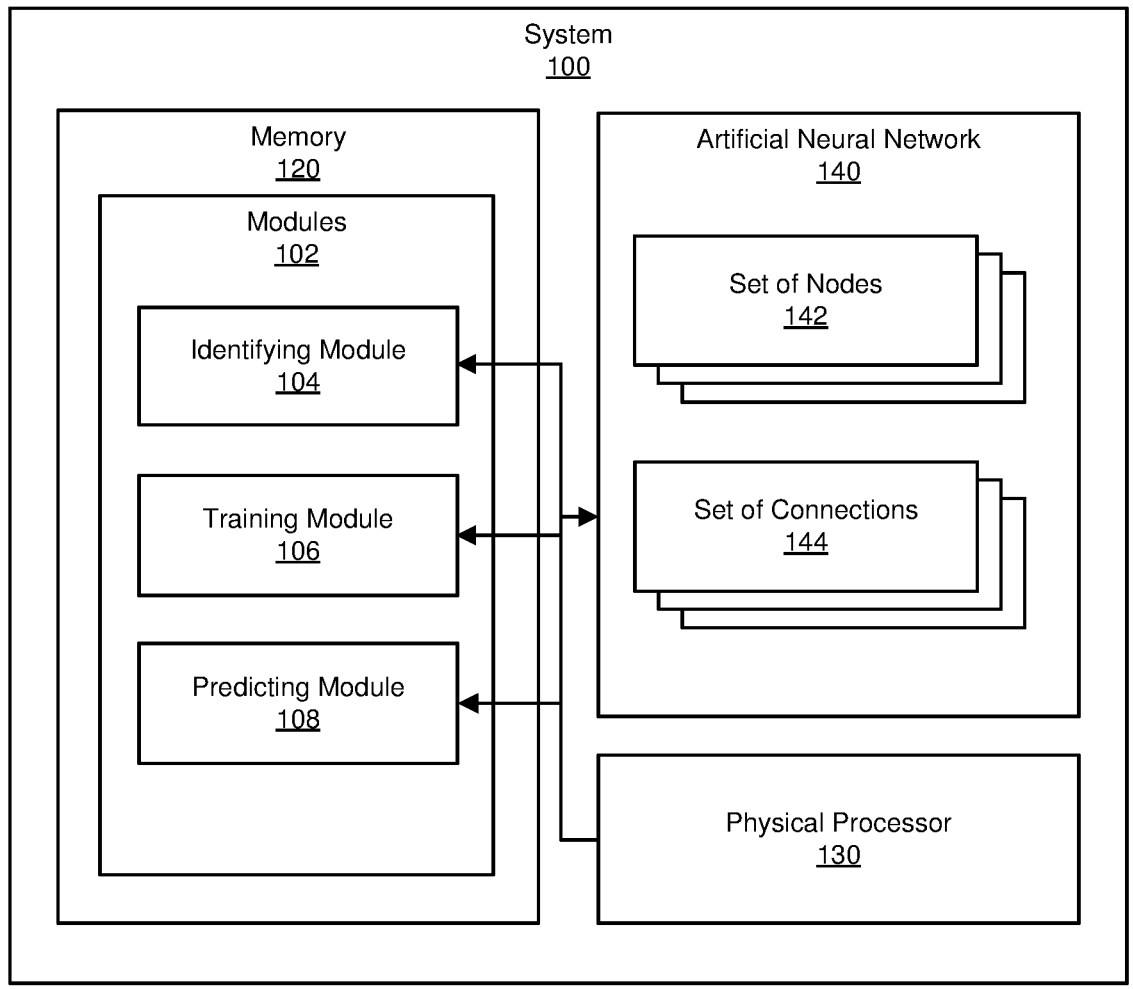
FIG. 1 is a block diagram of an example system for quantizing neural networks via periodic regularization functions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for quantizing neural networks via periodic regularization functions. As will be explained in greater detail below, embodiments of the instant disclosure may identify an artificial neural network that may include a set of nodes interconnected via a set of connections. An embodiment may also train the artificial neural network by, for each connection in the set of connections, determining a quantized weight value associated with the connection. In at least some embodiments, determining the quantized weight value associated with the connection may include associating a loss function with the connection, and the loss function may include a periodic regularization function that describes a relationship between an input value and a weight value of the connection. In some examples, the periodic regularization function may include a trigonometric function (e.g., a sine function, a cosine function, etc.). In additional examples, the periodic regularization function may include a sawtooth function and/or a triangular function.

As further described below, an embodiment of the instant disclosure may further determine the quantized weight value associated with the connection by determining a minimum of the associated loss function with respect to the weight value in accordance with the periodic regularization function. By minimizing the loss function that includes the periodic regularization function with respect to the weight value, this may influence a determined weight value for the connection to be closer to one of a set of a set of values that may cause the periodic regularization function to be at a minimum value (e.g., 0). Hence, determining such a minimum may cause the determined weight value to be closer to one of a set of identifiable values and/or one or more easily quantized values.

Furthermore, as described in greater detail below, an embodiment of the instant disclosure may further determine the quantized weight value associated with the connection by generating the quantized weight value associated with the connection based on the determined minimum of the loss function. For example, an embodiment may, in addition to other operations, scale the determined minimum of the loss function and/or round the determined minimum of the loss function to a nearest integer value. The embodiment may then designate the scaled and/or rounded determined minimum of the loss function as the quantized weight value associated with the connection.

By utilizing a periodic regularization function during the training process of an artificial neural network, the systems and methods described herein may simplify implementation of a quantization process for the artificial neural network. Additionally, the systems and methods described herein may improve the efficiency of quantization of artificial neural networks such that a quantization process may be efficiently implemented on computing hardware with fewer computing resources than may be required by traditional quantization processes. Therefore, the systems and methods described herein may improve the functioning of one or more computing devices. Furthermore, the systems and methods described herein may, through improving the ability of computing devices to make inferences regarding input data via quantized artificial neural networks, improve diverse fields such as pattern recognition, image recognition, data mining, medical diagnosis, and so forth.

The following will provide, with reference to FIGS. 1-2 and 4-9, detailed descriptions of systems for quantizing neural networks via periodic regularization functions. Detailed descriptions of corresponding computer-implemented methods will also be provided in connection with FIG. 3.

FIG. 1 is a block diagram of an example system 100 for quantizing neural networks via periodic regularization functions. As illustrated in this figure, example system 100 may include one or more modules 102 for performing one or more tasks. As will be explained in greater detail below, modules 102 may include an identifying module 104 that identifies an artificial neural network that may include a set of nodes interconnected via a set of connections. Example system 100 may further include a training module 106 that trains the artificial neural network by, for each connection in the set of connections, determining a quantized weight value associated with the connection. Training module 106 may determine the quantized weight value associated with the connection by associating a loss function with the connection. The loss function may include a periodic regularization function that describes a relationship between an input value and a weight value of the connection.

In some examples, training module 106 may further determine the quantized weight value associated with the connection by determining a minimum of the associated loss function with respect to the weight value in accordance with the periodic regularization function, and generating the quantized weight value associated with the connection based on the determined minimum of the loss function.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate quantizing neural networks via periodic regularization functions. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
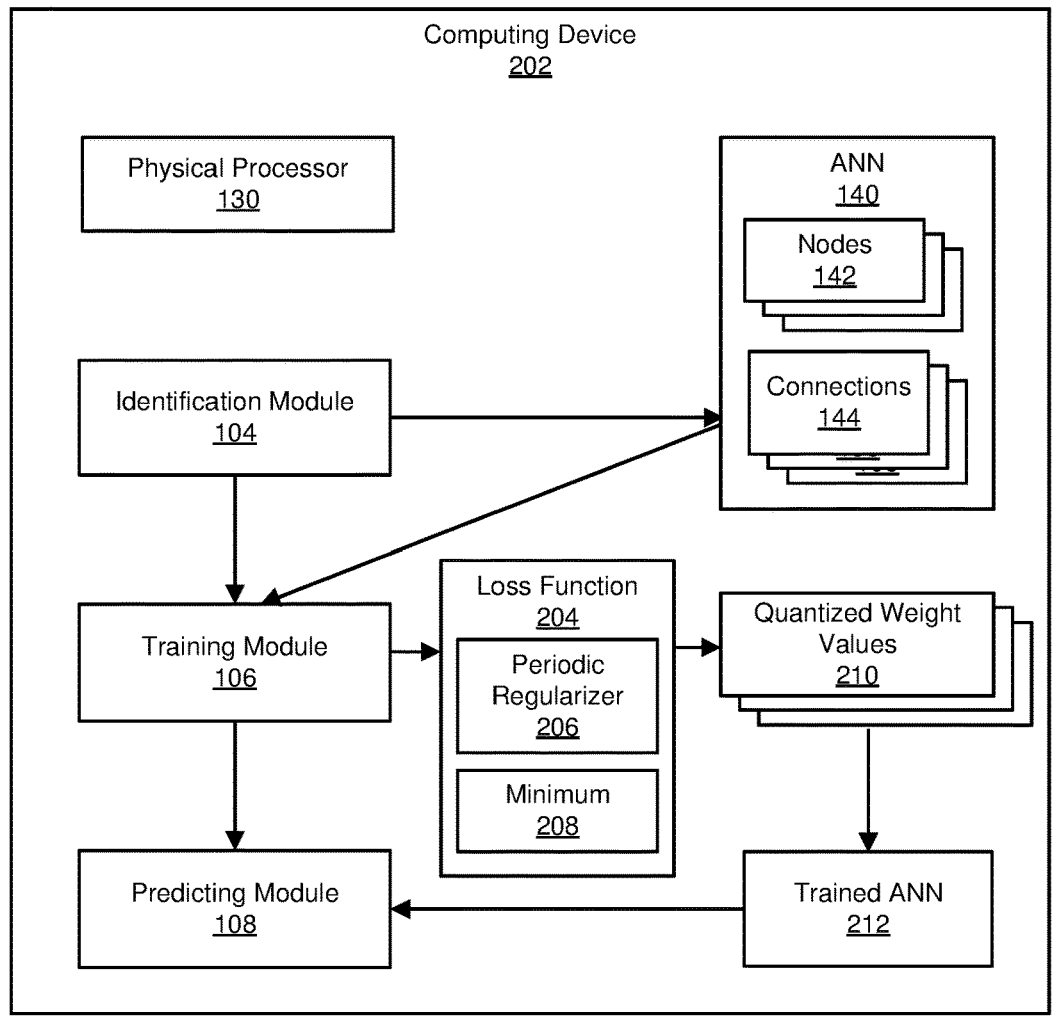
FIG. 2 is a block diagram of an example implementation of a system for quantizing neural networks via periodic regularization functions.

As also shown in FIG. 1, example system 100 may also include an artificial neural network 140 (also referred to as "ANN 140" in FIG. 2). In some embodiments, the term "artificial neural network" may refer to any software and/or hardware composed of processing nodes, such as set of nodes 142, interconnected via a set of connections, such as set of connections 144. These processing nodes, which may be referred to as "artificial neurons," may receive inputs and pass outputs to other artificial neurons. The output of each artificial neuron may be determined by a nonlinear function combination of each input to the artificial neuron, and each connection between artificial neurons (e.g., each connection included in set of connections 144) may be assigned a "weight" that may determine a degree to which a particular connection contributes to the output of the destination neuron(s). Artificial neural networks may be used in a variety of contexts, including, without limitation, image recognition, computer vision, speech recognition, and medical diagnosis. Artificial neural network 140 may be implemented in a variety of ways. In some embodiments, artificial neural network 140 may be implemented as software programs and/or any other suitable form of computer-readable instructions that are executed on one or more physical processors. In further embodiments, artificial neural network 140 may be implemented in physical hardware, such as a series of interconnected physical processors with each processor unit acting as an artificial neuron.

In some examples, an artificial neural network (e.g., artificial neural network 140) may implement one or more machine-learning models. In some examples, the term "model" may refer to any machine-learning model, algorithm, heuristic, data, or combination thereof, that may be trained to make predictions, make classifications, and/or perform other machine-learning tasks. Examples of models include, without limitation, decision trees (e.g., boosting decision trees), deep-learning models, support vector machines, linear classifiers, non-linear classifiers, perceptrons, feed-forward neural networks, convolution neural networks, recurrent neural networks, naive Bayes classifiers, any other machine-learning or classification techniques or algorithms, or any combination thereof.

Example system 100 in FIG. 1 may be implemented in a variety of ways. For example, all or a portion of example system 100 may represent portions of an example system 200 ("system 200") in FIG. 2. As shown in FIG. 2, system 200 may include computing device 202. In at least one example, computing device 202 may be programmed with one or more of modules 102.

In at least one embodiment, one or more modules 102 from FIG. 1 may, when executed by computing device 202, enable computing device 202 to perform one or more operations to quantize neural networks via periodic regularization functions. For example, as will be described in greater detail below, identifying module 104 may cause computing device 202 to identify an artificial neural network (e.g., artificial neural network 140) that may include a set of nodes (e.g., set of nodes 142) interconnected via a set of connections (e.g., set of connections 144).

Furthermore, in some examples, training module 106 may cause computing device 202 to train the artificial neural network by, for each connection in the set of connections (e.g., for each connection in set of connections 144), determining a quantized weight value associated with the connection (e.g., a quantized weight value in quantized weight values 210).

In at least some examples, training module 106 may cause computing device 202 to determine the quantized weight value associated with the connection by associating a loss function (e.g., loss function 204) with the connection. In at least one embodiment, the loss function may include a periodic regularization function (e.g., periodic regularization function 206, also "periodic regularizer 206" in FIG. 2) that describes a relationship between an input value and a weight value of the connection. In some examples, the periodic regularization function may include a trigonometric function, such as a sine or a cosine function, a sawtooth function, a triangle function, and so forth.

Additionally, in one or more embodiments, training module 106 may further cause computing device 202 to further determine the quantized weight value associated with the connection by determining a minimum of the associated loss function (e.g., minimum 208) with respect to the weight value in accordance with the periodic regularization function. In at least one example, training module 106 may further cause computing device 202 to further determine the quantized weight value associated with the connection by generating the quantized weight value associated with the connection based on the determined minimum of the loss function.

As further shown in FIG. 2, in some embodiments, system 200 may further include predicting module 108. In at least one example, predicting module 108 may predict an output value based on the input value via the trained artificial neural network (e.g., trained artificial neural network 212).

Computing device 202 generally represents any type or form of computing device capable of reading and/or executing computer-executable instructions and/or hosting executables. Examples of computing device 202 include, without limitation, desktop computers, laptop computers, mobile devices, application servers, storage servers, database servers, web servers, and/or any other suitable computing device configured to run certain software applications and/or provide various application, storage, and/or database services. In at least one example, one or more portions of computing device 202 may be included as part of a distributed computing platform and/or a software-as-a-service (SaaS) backend system that performs computing tasks for clients.

In at least one example, computing device 202 may represent one or more computing devices programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to quantize neural networks via periodic regularization functions. For example, computing device 202 may execute one or more of modules 102 (e.g., identifying module 104, training module 106) in order to identify and/or train an artificial neural network (e.g., artificial neural network 140). In further examples, computing device 202 may execute artificial neural network 140 and/or trained artificial neural network 212 via physical processor 130. This may enable one or more of modules 102 (e.g., predicting module 108) to make predictions regarding input data via a trained artificial neural network (e.g., trained artificial neural network 212).

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
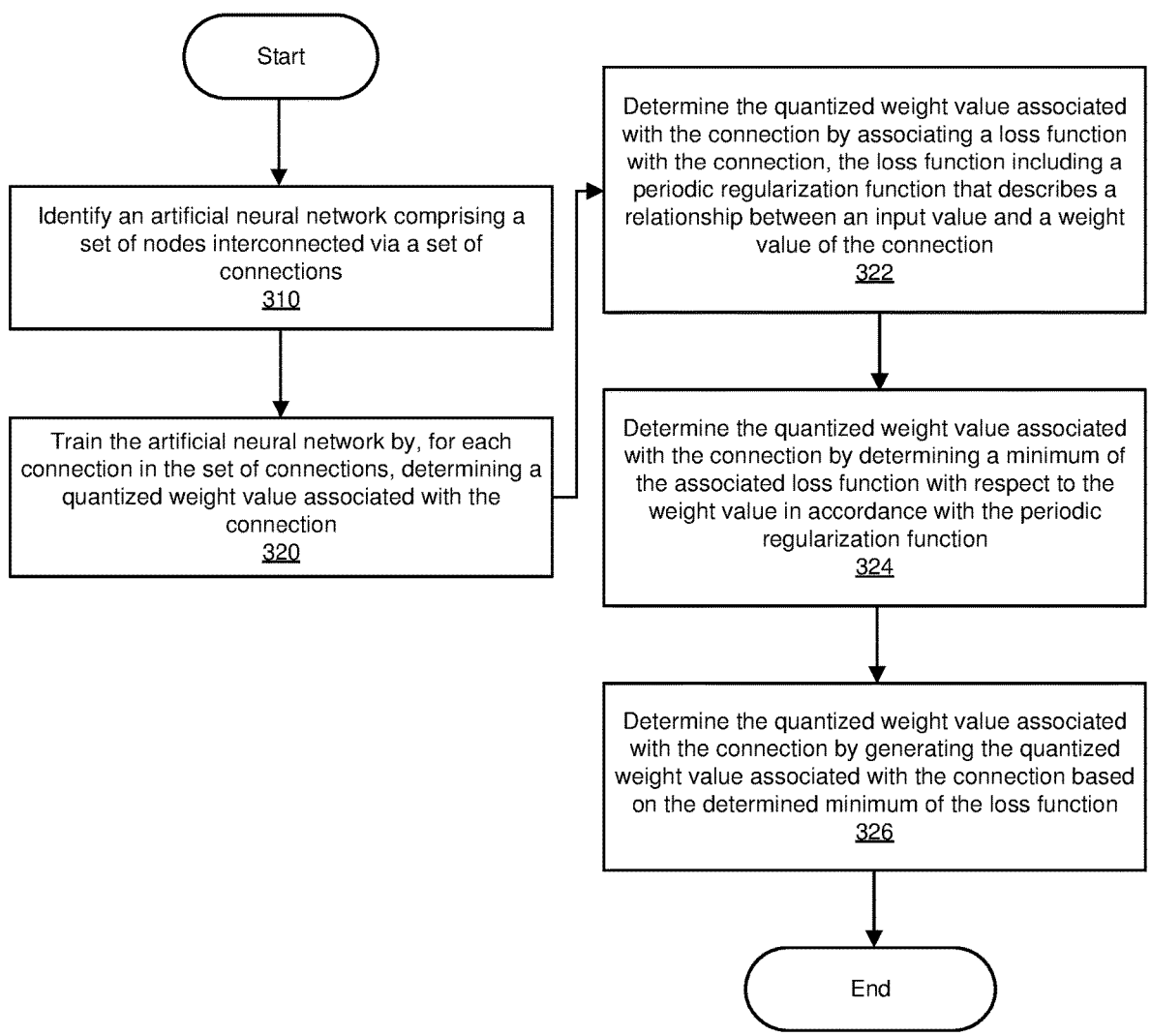
FIG. 3 is a flow diagram of an example method for quantizing neural networks via periodic regularization functions.

FIG. 3 is a flow diagram of an example computer-implemented method 300 for quantizing neural networks via periodic regularization functions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may identify an artificial neural network that may include a set of nodes interconnected via a set of connections. For example, identifying module 104 may, as part of computing device 202 in FIG. 2, cause computing device 202 to identify artificial neural network 140 that may include set of nodes 142 interconnected via set of connections 144.

Identifying module 104 may identify artificial neural network 140 in a variety of contexts. For example, identifying module 104 may execute as part of software executed by a computing system that predicts one or more output values based on one or more input values by executing an artificial neural network. In such examples, identifying module 104 may identify artificial neural network 140 prior to the computing system executing artificial neural network 140. Additionally or alternatively, identifying module 104 may receive artificial neural network 140 as a user-initiated input. For example, a software technician may provide artificial neural network 140 to identifying module 104 as part of configuring a system that will train and/or execute artificial neural network 140.

In further embodiments, identifying module 104 may execute as part of a software compilation suite that pre-processes software before delivering that software to an executing system. For example, identifying module 104 may execute as part of a pre-processing suite that quantizes artificial neural networks to enable other systems to execute those artificial neural networks within operating parameters of those other systems. Such pre-processing may occur at any suitable point, such as when the artificial neural network is being compiled and/or trained and/or after the artificial neural network has been compiled and/or trained but before the artificial neural network is executed by an executing system (e.g., computing device 202 via predicting module 108).

Figure 4:
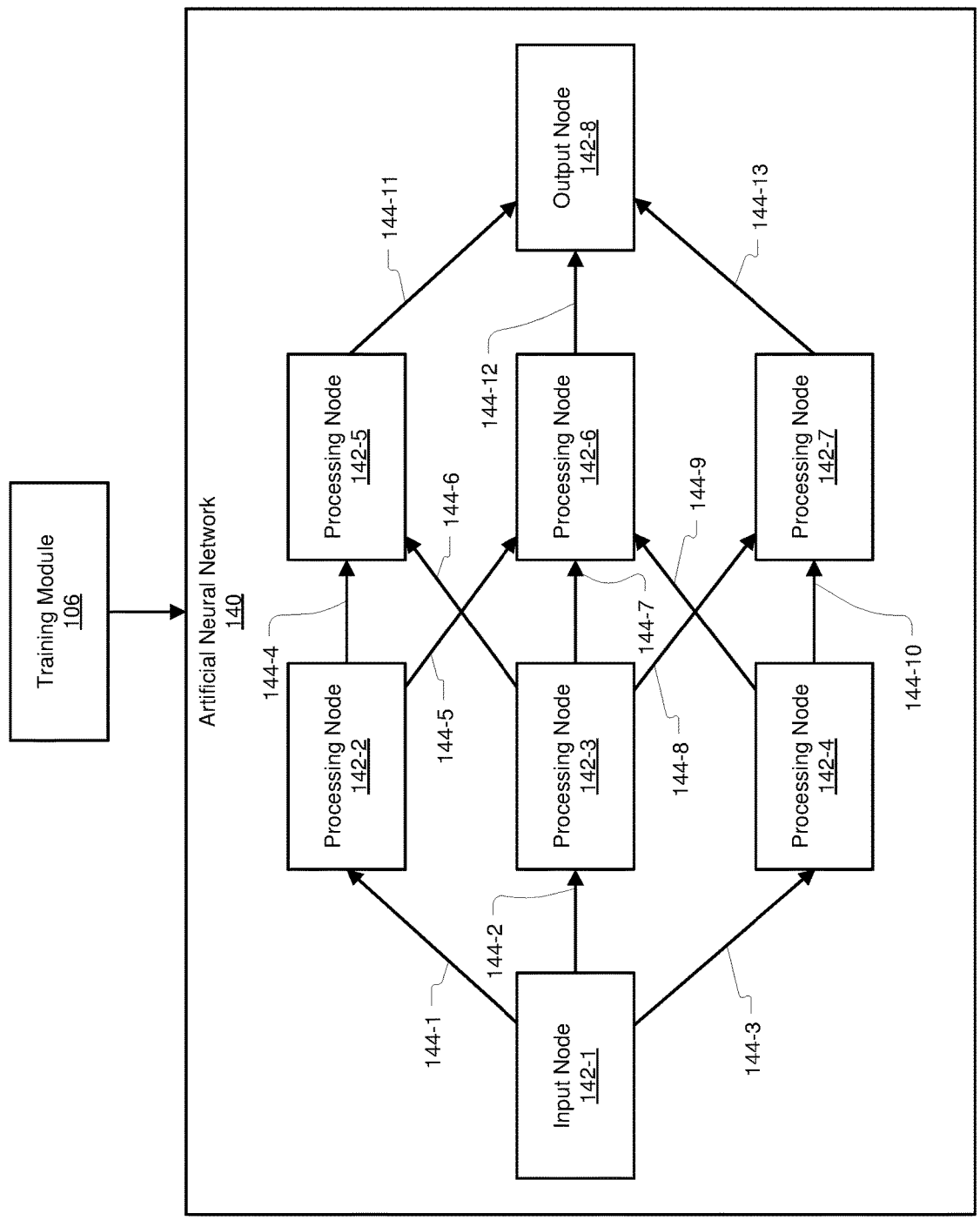
FIG. 4 is a block diagram of an example artificial neural network.

FIG. 4 shows an example of an artificial neural network (e.g., artificial neural network 140), including the underlying structure of the nodes (e.g., nodes included in set of nodes 142) and connections between nodes (e.g., connections included in set of connections 144) that make up the artificial neural network. As shown in FIG. 4, artificial neural network 140 may include an input node 142-1 that receives inputs to artificial neural network 140. For example, input node 142-1 may receive images to be processed by artificial neural network 140. Input node 142-1 may perform an operation based on the input and pass a result of the operation to processing nodes 142-2, 142-3, and/or 142-4 via connections 144-1, 144-2, and/or 144-3, respectively. Each of these processing nodes may assign a weight value to the input received from input node 142-1 via a respective connection, perform their own operations based on the weighted inputs, and pass the results of the operation to additional processing nodes.

In the example of FIG. 4, processing node 142-2 passes its output to processing node 142-5 via connection 144-4 and to processing node 142-6 via connection 144-5. Processing node 142-3 passes its output to processing node 142-5 via connection 144-6, to processing node 142-6 via connection 144-7, and to processing node 142-7 via connection 144-8. Processing node 142-4 passes its output to processing node 142-6 via connection 144-9 and to processing node 142-7 via connection 144-10. Furthermore, processing nodes 142-5, 142-6, and 142-7 pass their output to output node 142-8 via connections 144-11, 144-12, and 144-13, respectively.

Although artificial neural network 140 as shown in FIG. 4 includes a single input node (e.g., input node 142-1), six processing nodes arranged in two layers (e.g., processing nodes 142-2 through 142-7), and a single output node (e.g., output node 142-8), other examples of artificial neural networks may contain any number of input nodes, processing nodes, and/or output nodes connected in any suitable fashion. For example, nodes on the first layer of a more complex artificial neural network may be directly connected to nodes on both the second and third layer of the artificial neural network.

As further shown in FIG. 4, and as will be described in greater detail below, training module 106 may train artificial neural network 140 by determining, for each connection in set of connections 144, a quantized weight value associated with the connection. For example, training module 106 may determine a quantized weight value for connection 144-1, an additional quantized weight value for connection 144-2, and so forth. Regardless of the number and/or arrangement of nodes, training module 106 may nevertheless be able to determine a quantized weight value associated with any and/or all connections included in artificial neural network 140.

Return to FIG. 3, at step 320, one or more of the systems describe herein may train an artificial neural network by, for each connection in the set of connections, determining a quantized weight value associated with the connection. For example, training module 106 may, as part of computing device 202, determine a quantized weight value included in quantized weight values 210 associated with a connection included in set of connections 144.

Training module 106 may determine a quantized weight value included in quantized weight values 210 associated with a connection included in set of connections 144 in a variety of contexts. For example, as further shown in FIG. 3 at step 322, one or more of the systems described herein (e.g., training module 106) may determine the quantized weight value (e.g., a quantized weight value included in quantized weight values 210) associated with the connection by associating a loss function (e.g., loss function 204) with the connection, the loss function including a periodic regularization function (e.g., periodic regularization function 206) that describes a relationship between an input value and a weight value of the connection.

In some examples, to "train an artificial neural network" may describe a process whereby weight values for each connection in the neural network (e.g., for each connection included in set of connections 144) may be selected and/or evaluated. In at least some embodiments, training of an artificial network may include selecting a weight value for a connection included in an artificial neural network (e.g., artificial neural network 140) that may minimize a loss function that may describe a loss rate associated with the weight value and a prediction associated with the connection. In some examples, a "loss function" may include any function that may map an event or values of one or more variables onto a real number that may represent a cost associated with the event. For example, a loss function may represent a cost associated with making an inaccurate prediction in a classification problem. A loss function L may include, without limitation, a quadratic loss function, a 0-1 loss function, an expected loss function, a square loss function, a hinge loss function, a logistic loss function, a cross entropy loss function, an exponential loss function, and so forth.

Expressed in mathematical terms, training and/or optimization of an artificial neural network (e.g., at least one connection included in set of connections 144 included in artificial neural network 140) may be described as:

$$w_{opt} = \min_w \sum_{i=0}^{n} L(w, x_i)$$

where w may represent a weight value of a particular connection in an artificial neural network, $w_{opt}$ may represent an optimum value of w, and $L(w, x_i)$ may represent a loss function that represents a cost associated with a particular value of w with respect to a set of input values $x_1$, $x_2, \ldots x_n$.

In some examples, a "regularization function," "regularization term," and/or a "regularizer" may include any term that may be included with a loss function that may impose a limit on a complexity of a function. For example, a regularization term $\lambda R(w, x)$ may be added to the function above, $$w_{opt} = \min_w \sum_{i=0}^{n} L(w, x_i) + \lambda R(w, x_i)$$

where $R(w,x)$ may represent a regularization function and may represent a scaling factor that may scale an amount of influence that the regularization function may have on the overall loss function and/or a determination of an optimum and/or minimum value for w. This added regularization term may cause a minimum of w with respect to the loss function $L(w, x_i)$ to be within a definable range surrounding a value that may cause regularization term $\lambda R(w, x_i)$ to be minimized.

In some embodiments, a regularization function may be a periodic regularization function. In some examples, a "periodic function" may be any function that repeats its values in regular intervals or periods. Examples of periodic functions may include, without limitation, trigonometric functions such as sine and/or cosine functions, sawtooth functions, and/or triangular functions. Hence, in some examples, a "periodic regularization function" may include any periodic function that may impose a limit on complexity of a function and that repeats its values in regular intervals or periods. By adding such a periodic regularization function or term to a loss function as described herein, the systems and methods described herein may cause determined weight values of connections within an artificial neural network to cluster around a set of discrete points (e.g., points representative of values where regularization function $\lambda R(w, x_i)$ is at a minimum). This may facilitate quantization of the artificial neural network while maintaining predictive accuracy and/or precision of the quantized artificial neural network within acceptable limits.

Figure 5:
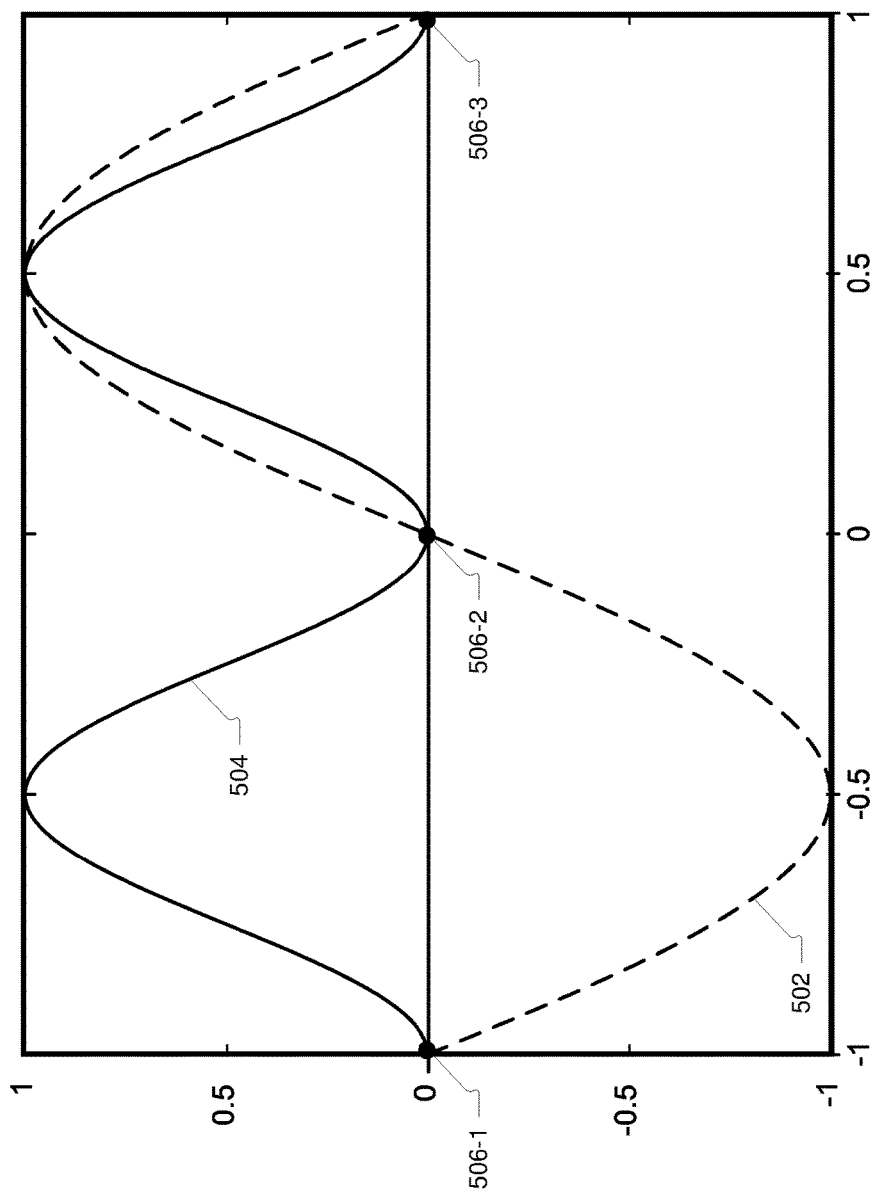
FIGS. 5-9 are graph diagrams that illustrate periodic regularization functions that may be used to quantize neural networks in accordance with the systems and methods described herein.

By way of illustration, an example trigonometric periodic regularization function, focused on weights rather than weights and input values, may include:

$$R(w) = \sum_{i=0}^{n} \sin^2\left(\pi \times f \times \left(\frac{w_i}{w_{max}}\right)\right)$$

where f may represent a frequency of the periodic regularization function. To illustrate, FIG. 5 shows a graph 500 of such a trigonometric periodic regularization function. As shown, curve 502 may correspond to a periodic regularization function that may include a sine term (e.g., $R(w) = \sum_{i=0}^{n}$ sin ($\pi \times f \times (w_i/w_{max})$))), and curve 504 may correspond to a periodic regularization function that may include a squared sine term (e.g., $R(w) = \sum_{i=0}^{n} \sin^2 (\pi \times f \times (w_i/w_{max}))$). In the example illustrated in graph 500, both periodic regularization functions may include a frequency term f=1, which may cause curve 502 and curve 504 to have a frequency of 1. Points 506 (e.g., point 506-1, point 506-2, and point 506-3) show discrete locations where either function is equal to 0, and hence at a minimum absolute value for each equation. When w has a value such that R(w) equals zero, such a weight value may be a minimum value for a loss function that includes such a periodic regularization function.

Hence, training module 106 may determine a weight value associated with a connection included in set of connections 144 by (1) associating a loss function (e.g., loss function 204) with the connection that includes a periodic regularization function (e.g., periodic regularization function 206) that describes a relationship between an input value and a weight value of the connection, and (2) determining a minimum (e.g., minimum 208) of the loss function associated with the connection with respect to the weight value and in accordance with the periodic regularization function. Such a determined minimum may be, due to the periodic nature of the periodic regularization function, within a range of at least one of a set of weight values that may correspond to at least one of points 506 where a value of regularization term R(w) may be at a minimum and/or a minimum absolute value (e.g., 0 in examples where the periodic regularization function may include a squared trigonometric term such as $\sin^2 (w)$).

Figure 6:
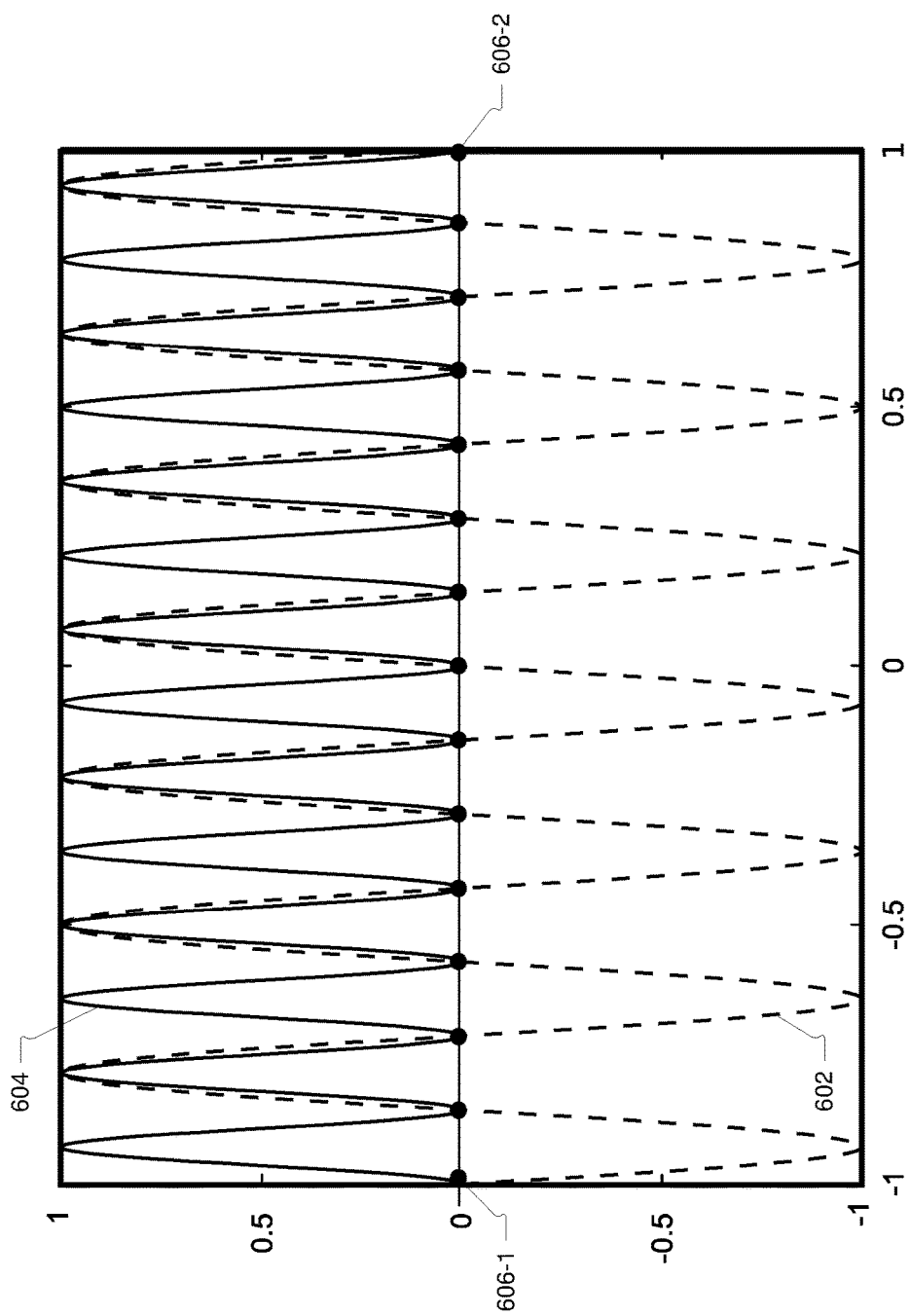

In some examples, a frequency term of the periodic regularization function may be associated with a number of possible minimum values for w. For example, FIG. 6 shows a graph 600 of the trigonometric periodic regularization functions illustrated in graph 500, but with a frequency term f=7. This may cause curve 602 and curve 604 to have a frequency of 7. Points 606 (e.g., point 606-1 and point 606-2) indicate two of fifteen points where either function is equal to 0, and hence at a minimum for the equation represented by curve 604. When w has a value such that R(w) equals zero, such a weight value may be an appropriate minimum value for a loss function that includes such a periodic regularization function, and hence training module 106 may select such a weight value for a connection associated with the loss function that includes the periodic regularization function.

In some embodiments, a frequency term of a periodic regularization function may be associated with a number of bits for a quantized weight value. For example, one or more of modules 102 (e.g., training module 106) may use the formula $$f = 2^{b-1} - 1$$

to convert a number of bits b to a frequency f for a periodic regularization function. Conversely, training module 106 may use the formula $$b = \text{ceiling}(\log_2(2f+1))$$

to convert a frequency f to a number of bits b. To illustrate, one or more of modules 102 (e.g., training module 106) may receive, from any suitable source (e.g., from a user, from a memory location within memory 120, from one or more other modules 102, etc.), a number of bits for a quantized weight value of 4 bits, and may, via the foregoing formulas, determine a frequency for a periodic regularization function of 7 Hz. Similarly, in some embodiments, one or more of modules 102 (e.g., training module 106) may receive, from any suitable source (e.g., from a user, from a memory location within memory 120, from one or more other modules 102, etc.), a frequency of 1 Hz, and may use the foregoing formulas to determine a number of bits for a quantized weight value of 2 bits.

As mentioned above, in at least some examples, a periodic regularization function may further include a scaling factor. Such a scaling factor may be denoted, as above, by the Greek letter $\lambda$, and may indicate an importance of the regularization term R relative to the loss function L. In some examples, the scaling factor may be defined in terms of a maximum value of the periodic regularization function, and may scale the periodic regularization function such that a result of the periodic regularization function may be in an inclusive range from 0 to 1. This may serve to reduce a number of hyper-parameters included in the training process associated with artificial neural network 140.

Furthermore, in at least on embodiment, a periodic regularization function may also include an amplitude factor. To illustrate, a periodic regularization function may be expressed mathematically as $$R(w) = \sum_{i=0}^{n} A \times \sin^2\left(\pi \times f \times \left(\frac{w_i}{w_{max}}\right)\right)$$

where f may represent a frequency of the periodic regularization function and A may represent an amplitude factor associated with the periodic regularization function.

In some examples, such an amplitude factor may be used as a hyper-parameter during training of an artificial neural network (e.g., artificial neural network 140), and it may be adjusted (e.g., dynamically and/or statically) as part of the training process in order to achieve higher test accuracy. In some such examples, the amplitude factor may subsume a scaling factor (e.g., $\lambda$). Hence, in at least one example, one or more of modules 102 (e.g., training module 106) may, while training an artificial neural network (e.g., artificial neural network 140), adjust an amplitude factor included in a periodic regularization function (e.g., periodic regularization function 206).

In some embodiments, one or more of modules 102 (e.g., training module 106) may adjust the amplitude factor based on a measured and/or anticipated predictive accuracy of a trained artificial neural network. For example, training module 106 may train (e.g., begin a training process) artificial neural network 140 while using a periodic regularization function having an amplitude factor having a first amplitude factor value (e.g., 1). This may result in at least a portion of trained artificial neural network 212 having a first anticipated predictive accuracy (e.g., 30%). Training module 106 may then, based on this first predictive accuracy being below a predetermined threshold (e.g., 75%) train (e.g., re-train, continue to train, etc.) artificial neural network 140 by adjusting the amplitude factor included in the periodic regularization function to a second amplitude factor value (e.g., 0.001). This adjustment may result in trained artificial neural network 212 having a second anticipated predictive accuracy that may be above the predetermined threshold (e.g., 90%).

Additionally, as mentioned above, a periodic regularization function may include a periodic triangular function and/or a periodic sawtooth function. By way of illustration, an example triangular periodic regularization function (e.g., a "hat" regularization function), focused on weights rather than weights and input values, may include:

$$R(w) = \sum_{i=0}^{n} A \times \left|\left(\left(f \times \left(\left(\frac{w_i}{w_{max}}\right) - 0.5\right)\right) \% 1\right) \times 2 - 1\right|$$

where f may represent a frequency of the triangular periodic regularization function, A may represent an amplitude factor associated with the triangular periodic regularization function, and % may represent a modulo function.

Figure 7:
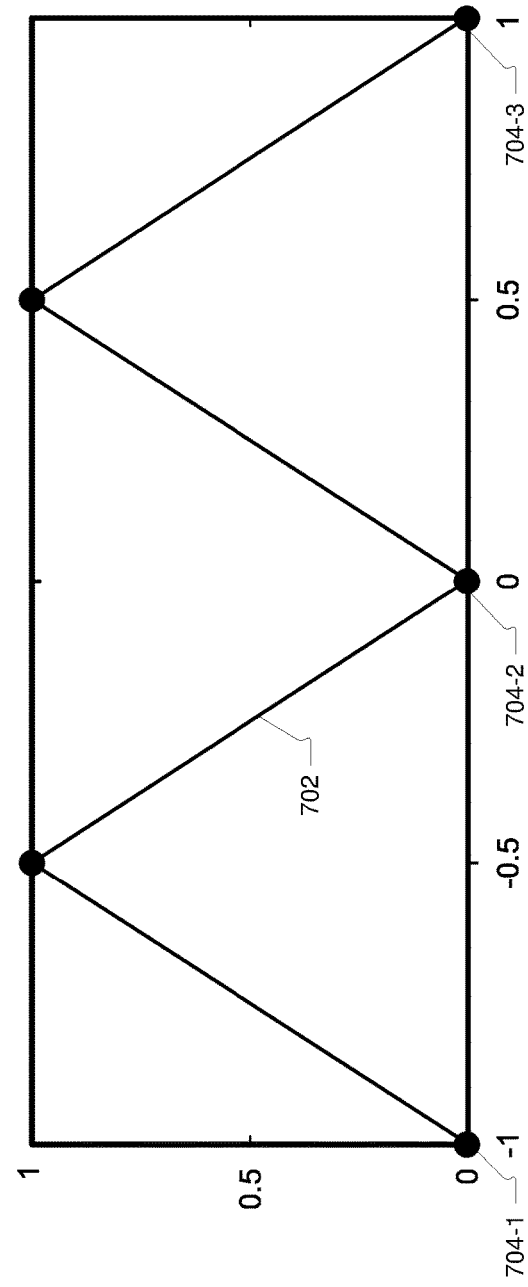
Figure 8:
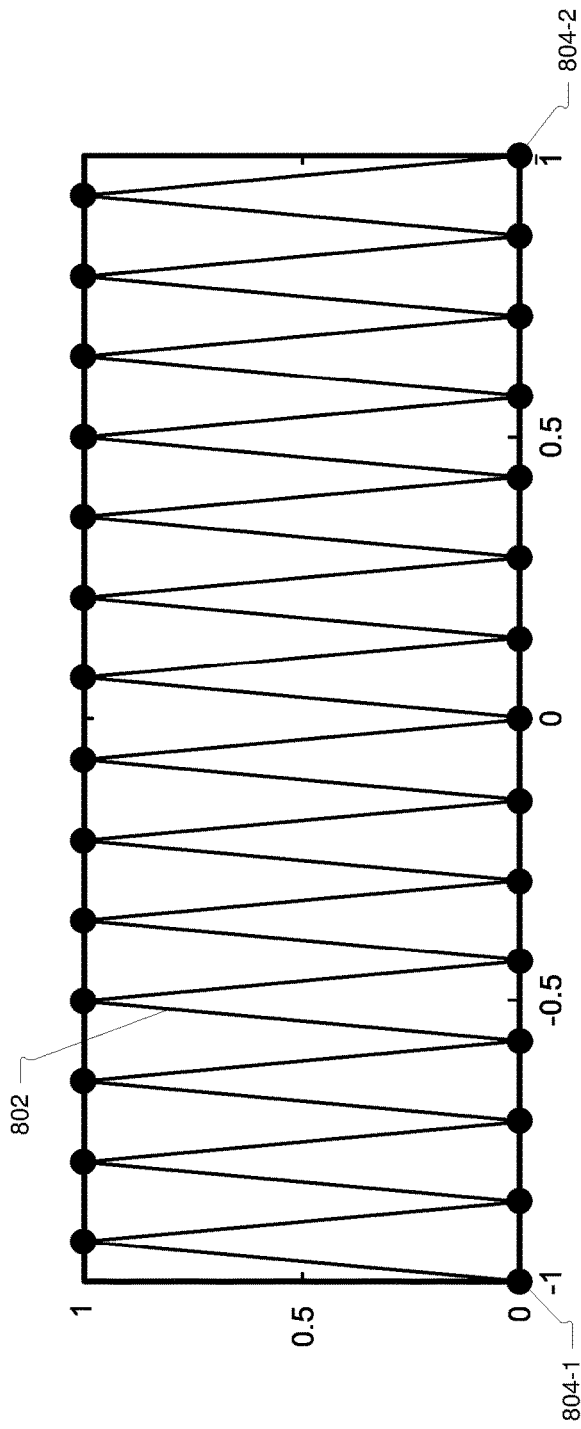

To illustrate, FIG. 7 includes a graph 700 that includes a curve 702 that may correspond to a triangular periodic regularization function with a frequency f=1. As shown, curve 702 may achieve minimum values at points 704 (e.g., point 704-1, point 704-2, and/or point 704-3). Hence, in some embodiments, a periodic regularization function (e.g., periodic regularization function 206) may include a periodic triangular function, and may push potential weight values determined in accordance with a corresponding loss function to values that may minimize the triangular function (e.g., to values corresponding to points 704) in accordance with the systems and methods described herein.

As mentioned above, in some examples, a frequency term of the triangular periodic regularization function may be associated with a number of possible minimum values for w. For example, FIG. 8 includes a graph 800 of the triangular periodic regularization function illustrated in graph 700, but with a frequency term f=7. This may cause curve 802 to have a frequency of 7. Points 804 (e.g., point 804-1 and point 804-2) may indicate two of fifteen points where the triangular periodic regularization function is equal to 0, and hence at a minimum for the equation represented by curve 802. When w has a value such that R(w) equals zero, such a weight value may be an appropriate minimum value for a loss function that includes such a triangular periodic regularization function, and hence training module 106 may select such a weight value for a connection associated with the loss function that includes the periodic regularization function.

Figure 9:
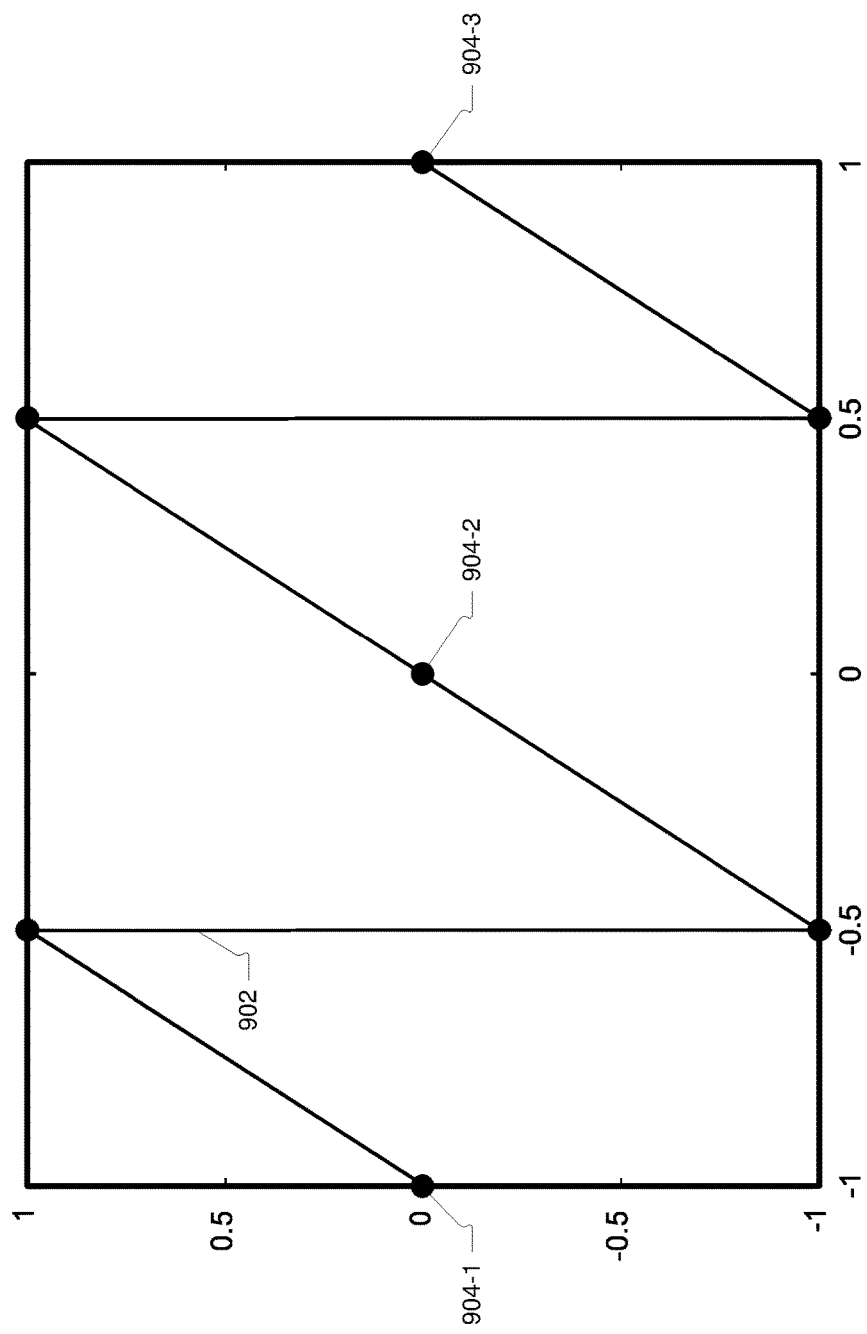

Furthermore, FIG. 9 includes a graph 900 that includes a curve 902 that may correspond to a periodic sawtooth function. As shown, curve 902 may achieve minimum absolute values at points 904 (e.g., point 904-1, point 904-2, and/or point 904-3). Hence, in some embodiments, a periodic regularization function (e.g., periodic regularization function 206) may include a periodic sawtooth function, and may push potential weight values determined in accordance with a corresponding loss function to values that may minimize the sawtooth function (e.g., to values corresponding to points 904) in accordance with the systems and methods described herein.

Training module 106 may associate a loss function (e.g., loss function 204) that may include a periodic regularization function (e.g., periodic regularization function 206) with a connection included in a set of connections included in an artificial neural network (e.g., set of connections 144 included in artificial neural network 140) in a variety of contexts. For example, in at least one embodiment, training module 106 may receive a loss function that includes a periodic regularization function and that corresponds to a connection included in set of connections 144 from a user, and may associate the received loss function with the connection. Such loss functions may include, without limitation, a quadratic cost function, a cross-entropy cost function, an exponential cost function, a Hellinger Distance function, a Kullback-Leibler Divergence function, an Itakura-Saito Distance function, and so forth.

Additionally or alternatively, training module 106 may identify a suitable loss function for a connection included in set of connections 144 as part of a training process. For example, training module 106 may receive a set of input data and a set of initial weights for the connections included in the set of connections. Training module 106 may then execute a supervised or unsupervised learning process via artificial neural network 140 whereby training module 106 may determine, based on output produced by one or more nodes and/or connections included in artificial neural network 140, a loss function for each connection included in the set of connections, and may then associate each identified loss function with the corresponding connection.

Returning to FIG. 3, at step 324, training module 106 may, as part of computing device 202, further determine the quantized weight value in quantized weight values 210 associated with the connection included in set of connections 144 by determining a minimum of loss function with respect to the weight value in accordance with the periodic regularization function. For example, training module 106 may determine minimum 208 of loss function 204 that includes periodic regularization function 206.

Training module 106 may determine minimum 208 of loss function 204 that includes periodic regularization function 206 in any suitable way. For example, training module 106 may calculate minimum 208 via a gradient descent method and/or a gradient descent optimization method including, without limitation, batch gradient descent, mini-batch gradient descent, stochastic gradient descent, momentum-based optimization, Nesterov accelerated gradient, adaptive moment estimation, Nesterov accelerated adaptive moment estimation, an adaptive gradient algorithm (e.g., AdaGrad, AdaDelta, etc.), and so forth. Additionally or alternatively, training module 106 may determine minimum 208 via application of a backpropagation algorithm to artificial neural network 140.

As described above, determining a minimum of a loss function in accordance with a periodic regularization function may push potential values of the determined minimum weight to a set of discrete points, such as values that may cause the periodic regularization function to be at a minimum value. Hence, a determined weight value may be pushed closer to one of a set of discrete, easily quantizable values.

Returning to FIG. 3, at step 326, training module 106 may, as part of computing device 202, further determine the quantized weight value in quantized weight values 210 associated with the connection included in set of connections 144 by generating the quantized weight value associated with the connection based on the determined minimum of the loss function (e.g., minimum 208).

Training module 106 may generate the quantized weight value associated with a particular connection in a variety of contexts. For example, training module 106 may generate the quantized weight value associated with the connection by selecting a subset of connections from the set of connections that includes the particular connection (e.g., a set of connections included in a convolutional layer of artificial neural network 140), and may identify a maximum absolute value of the determined minimums of the loss functions associated with the connections included in the set of connections. Training module 106 may then scale the minimum of the loss function based on the identified maximum absolute value and a frequency (e.g., a frequency of a periodic regularization function included in a loss function associated with the connection). Training module 106 may then round the scaled minimum of the loss function to a nearest integer value, and may then re-scale the rounded and scaled minimum of the loss function based on the maximum absolute value of the frequency. Training module 106 may then designate the re-scaled minimum of the loss function as the quantized weight value associated with the connection.

Figure 10:
FIG. 10 is a listing that may illustrate computer code that may, when executed by at least one or more processors of a computing device, cause the device to generate a quantized weight value in accordance with the systems and methods described herein.

By way of illustration, FIG. 10 shows listing 1000 that includes computer code that may, when executed by a physical processor included in a computing device (e.g., physical processor 130 included in computing device 202), cause the computing device to generate a quantized weight value associated with a connection. Listing 1000 may describe various operations relating to a data object m that may represent a matrix object that may include one or more weight objects. The weight objects may describe weights of connections included in an artificial neural network (e.g., set of connections 144 included in artificial neural network 140). Prior to execution of the code included in listing 1000, the weights included in matrix m may represent determined minimums of loss functions (i.e., non-quantized weight values) associated with connections included in the artificial neural network, the loss functions including periodic regularization functions.

In line 1002, data object max_w may be assigned a maximum absolute value of the values of the weight objects included in matrix object m. In line 1004, the weight values may be scaled in accordance with (e.g., multiplied by) a ratio of a frequency and the assigned maximum absolute value. In line 1006, the weight values may be rounded (e.g., to a nearest integer value). In line 1008, the weight values may be re-scaled based on the maximum absolute value and the frequency (i.e., a ratio of the data value of data object max_w and the frequency). This operation may further designate the re-scaled values as the quantized weight values associated with the connections included in the artificial neural network.

In some embodiments, one or more of the systems described herein may predict an output value based on an input value via a trained artificial neural network. For example, predicting module 108 may, as part of computing device 202, predict an output value based on an input value via trained artificial neural network 212.

Predicting module 108 may predict an output value based on an input value via trained artificial neural network 212. For example, as described above, trained artificial neural network 212 may incorporate quantized weight values 210 as weight values corresponding to connections included in set of connections 144. Predicting module 108 may therefore cause trained artificial neural network 212 to receive an input value, and may utilize trained artificial neural network 212 to predict an output value based on the input value.

By way of illustration, predicting module 108 and trained artificial neural network 212 may be incorporated into a program that may utilize trained artificial neural network 212 to identify human faces in photographs. Predicting module 108 may receive a set of pixel values (e.g., position, color, and/or luminance values) included in a digital image as an input value. Predicting module 108 may provide the set of pixels as input to trained artificial neural network 212, and may cause trained artificial neural network 212 to execute. Upon execution, the trained artificial neural network may produce an output value that includes a prediction that the set of pixel values may include a visual representation of a human face. This example is merely illustrative, as the systems and methods described herein may facilitate prediction of any suitable output value based on any suitable input value via an artificial neural network that has been trained (i.e., quantized) in accordance with the principles described herein.

As discussed throughout the instant disclosure, the disclosed systems and methods may provide one or more advantages over traditional options for quantizing artificial neural networks. For example, incorporating a periodic regularization function into a loss function as described herein may push weight values associated with connections included in an artificial neural network toward discrete values included in a defined set of values (e.g., values that minimize the periodic regularization function). This may result in weight values obtained during the training process that may be simply and accurately quantized (e.g., converted from floating point numbers such as 32-bit floating point numbers to integers such as 8-bit integers) without a significant negative impact on predictive accuracy and/or precision of the artificial neural network.

For example, a trigonometric periodic regularization function with a frequency f=1 as shown in FIG. 5 may cause the weight value of a connection to be at or near one of three discrete locations. As another example, a trigonometric periodic regularization function with a frequency f=7 as illustrated in FIG. 6 may cause the weight value of a connection to be at or near one of 15 discrete locations.

Additionally, a frequency of a periodic regularization function may be associated with a bit depth of a quantized weight value. For example, as described above, a frequency f may be related to a number of bits b in accordance with $f=2^{b-1}$ and $b=\text{ceiling}(\log_2(2f+1))$. For example, a frequency of 1 Hz may imply a bit depth of 2 bits, whereas a frequency of 7 Hz may imply a bit depth of 4 bits.

Furthermore, in some embodiments, a periodic regularization function may include additional parameters that may simplify and/or improve an accuracy of a training process. For example, the periodic regularization function may further include a scaling factor. The scaling factor may scale the periodic regularization function such that a result of the periodic regularization function may be in an inclusive range from 0 to 1. This may be used to facilitate and/or define a scaling term that may be included in the periodic regularization function, thereby reducing a number of hyper-parameters included in a model of the artificial neural network. Additionally, an amplitude factor may be included in a periodic regularization function. In some examples, the amplitude factor may be adjusted during a training process in order to simplify the training process and/or to obtain higher test accuracy.

The systems and methods described herein may produce and/or result in trained artificial neural networks (e.g., trained artificial neural network 212) that may include quantized weight values (e.g., quantized weight values 210) associated with respective connections included in the trained artificial neural networks. Such quantized artificial neural networks may be capable of making accurate and/or precise predictions when executed by certain types of hardware that may be optimized for integer (e.g., INT8) operations, such as mobile devices (e.g., mobile phones, tablet computers, vehicle-based computing devices, wearable computing devices, etc.), Internet-of-Things devices, embedded computing devices, and so forth. Hence, in some embodiments, one or more of the systems described herein (e.g., one or more of modules 102, such as predicting module 108) may predict an output value (e.g., identify an object in an image, recognize a handwritten character, recognize and/or interpret speech, etc.) based on an input value (e.g., image data, audio data, etc.) via the trained artificial neural network.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive training data to be transformed, transform the training data, output a result of the transformation to train an artificial neural network (e.g., artificial neural network 140) to make predictions regarding input data, use the result of the transformation to make one or more predictions regarding input data via the trained artificial neural network, and store the result of the transformation to further train the trained artificial neural network and/or to make further predictions regarding additional input data via the trained artificial neural network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying an artificial neural network comprising a set of nodes interconnected via a set of connections; and
   training the artificial neural network by, for each connection in the set of connections, determining a quantized weight value associated with the connection, wherein determining the quantized weight value associated with the connection comprises:
      receiving data representative of a number of bits for a representation of the quantized weight value;
      associating a loss function with the connection, the loss function comprising a periodic regularization function that describes a relationship between an input value and a weight value of the connection, the associating comprising determining a frequency for the periodic regularization function in accordance with a pre-determined relationship between the frequency and the received number of bits;
      determining a minimum of the associated loss function with respect to the weight value in accordance with the periodic regularization function; and
      generating the quantized weight value associated with the connection based on the determined minimum of the loss function.

2. The computer-implemented method of claim 1, wherein the periodic regularization function comprises a trigonometric function.

3. The computer-implemented method of claim 2, wherein the trigonometric function comprises at least one of:
   a sine function; or
   a cosine function.

4. The computer-implemented method of claim 1, wherein the periodic regularization function comprises a sawtooth function.

5. The computer-implemented method of claim 1, wherein the periodic regularization function comprises a triangular function.

6. The computer-implemented method of claim 1, wherein the periodic regularization function comprises a scaling factor.

7. The computer-implemented method of claim 6, wherein the scaling factor scales the periodic regularization function such that a result of the periodic regularization function is in an inclusive range from 0 to 1.

8. The computer-implemented method of claim 1, wherein generating the quantized weight value associated with the connection based on the determined minimum of the loss function comprises:
   selecting a subset of connections from the set of connections, the connection included in the selected subset of connections;
   identifying a maximum absolute value of the determined minimums of the loss functions associated with the connections included in the subset of connections;
   scaling the minimum of the loss function based on the identified maximum absolute value and a frequency;
   rounding the scaled minimum of the loss function to a nearest integer value;
   re-scaling the rounded and scaled minimum of the loss function based on the maximum absolute value and the frequency; and
   designating the re-scaled minimum of the loss function as the quantized weight value associated with the connection.

9. The computer-implemented method of claim 1, wherein the periodic regularization function comprises an amplitude factor.

10. The computer-implemented method of claim 1, further comprising predicting an output value based on the input value via the trained artificial neural network.

11. The computer-implemented method of claim 1, wherein the pre-determined relationship between the frequency and the received number of bits comprises a pre-determined function that relates the received number of bits to the frequency.

12. A system comprising:
   an identifying module, stored in memory, that identifies an artificial neural network comprising a set of nodes interconnected via a set of connections; and
   a training module, stored in memory, that trains the artificial neural network by, for each connection in the set of connections, determining a quantized weight value associated with the connection, wherein the training module determines the quantized weight value associated with the connection by:
      receiving a number of bits for a representation of the quantized weight value; and
      associating a loss function with the connection, the loss function comprising a periodic regularization function that describes a relationship between an input value and a weight value of the connection, the associating comprising determining a frequency for the periodic regularization function in accordance with a pre-determined relationship between the frequency and the received number of bits;
      determining a minimum of the associated loss function with respect to the weight value in accordance with the periodic regularization function; and
      generating the quantized weight value associated with the connection based on the determined minimum of the loss function; and
   at least one physical processor that executes the identifying module and the training module.

13. The system of claim 12, wherein the periodic regularization function comprises a trigonometric function.

14. The system of claim 13, wherein the trigonometric function comprises at least one of:
   a sine function; or
   a cosine function.

15. The system of claim 12, wherein the periodic regularization function comprises at least one of:
a sawtooth function; or
a triangular function.

16. The system of claim 12, wherein the periodic regularization function comprises a scaling factor.

17. The system of claim 12, wherein the training module generates the quantized weight value associated with the connection based on the determined minimum of the loss function by:
selecting a subset of connections from the set of connections, the connection included in the selected subset of connections;
identifying a maximum absolute value of the determined minimums of the loss functions associated with the connections included in the subset of connections;
scaling the minimum of the loss function based on the identified maximum absolute value and a frequency;
rounding the scaled minimum of the loss function to a nearest integer value;
re-scaling the rounded and scaled minimum of the loss function based on the maximum absolute value and the frequency; and
designating the re-scaled minimum of the loss function as the quantized weight value associated with the connection.

18. The system of claim 12, wherein:
the system further comprises a predicting module that predicts an output value based on the input value via the trained artificial neural network; and
the physical processor further executes the predicting module.

19. The system of claim 12, wherein the pre-determined relationship between the frequency and the received number of bits comprises a pre-determined function that relates the received number of bits to the frequency.

20. A non-transitory computer-readable medium comprising computer-readable instructions that, when executed by at least one processor of a computing system, cause the computing system to:
identify an artificial neural network comprising a set of nodes interconnected via a set of connections; and
train the artificial neural network by, for each connection in the set of connections, determining a quantized weight value associated with the connection, wherein determining the quantized weight value associated with the connection comprises:
receiving a number of bits for a representation of the quantized weight value;
associating a loss function with the connection, the loss function comprising a periodic regularization function that describes a relationship between an input value and a weight value of the connection, the associating comprising determining a frequency for the periodic regularization function in accordance with a pre-determined relationship between the frequency and the received number of bits;
determining a minimum of the associated loss function with respect to the weight value in accordance with the periodic regularization function; and
generating the quantized weight value associated with the connection based on the determined minimum of the loss function.

* * * * *